(12) United States Patent
Huang et al.

(10) Patent No.: US 12,250,127 B2
(45) Date of Patent: Mar. 11, 2025

(54) GROUP NODE EDITING METHOD AND APPARATUS

(71) Applicant: BEIJING ZITIAO NETWORK TECHNOLOGY CO., LTD., Beijing (CN)

(72) Inventors: Xiaobo Huang, Beijing (CN); Yuan Xu, Beijing (CN); Weifeng Huang, Beijing (CN); Ruifeng Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 18/055,046

(22) Filed: Nov. 14, 2022

(65) Prior Publication Data

US 2023/0198861 A1    Jun. 22, 2023

(30) Foreign Application Priority Data

Dec. 17, 2021    (CN) .......................... 202111551407.X

(51) Int. Cl.
*H04L 41/00* (2022.01)
*H04L 41/22* (2022.01)
*H04L 49/15* (2022.01)

(52) U.S. Cl.
CPC .............. *H04L 41/22* (2013.01); *H04L 49/15* (2013.01)

(58) Field of Classification Search
CPC ..... H04L 41/22; H04L 49/15; H04L 41/0893; H04L 41/12; G06F 8/34; G06F 8/20; G06F 8/38; G06F 9/451
See application file for complete search history.

(56) References Cited

U.S. PATENT DOCUMENTS

| 9,077,616 | B2* | 7/2015 | Chen .................. H04L 41/0663 |
| 10,187,271 | B2* | 1/2019 | Okano .................... H04L 41/22 |
| 11,044,215 | B1* | 6/2021 | Morris .................... H04L 51/08 |
| 2011/0106795 | A1 | 5/2011 | Maim |

(Continued)

FOREIGN PATENT DOCUMENTS

| CN | 107948105 A | * | 4/2018 | .......... H04L 49/253 |
| CN | 108351767 A | | 7/2018 | |

(Continued)

OTHER PUBLICATIONS

Search Report mailed Jan. 13, 2023 in PCT/CN2022/129758, English translation (10 pages).

*Primary Examiner* — Laurie A Ries

(57) ABSTRACT

The present disclosure is related to receiving a first operation on a target group node; in response to the first operation, displaying a node presentation interface; receiving a second operation on an output node in the nodes constituting the target group node; in response to the second operation, adding a first port on the output node, adding a second port corresponding to the first port on the target group node, and setting the port types of the first port and the second port to a first type; receiving a third operation, where the third operation is used to connect the first port and the third port; in response to the third operation, connecting the first port and the third port, and setting the port types of the first port and the second port to a second type, the second type being the port type of the third port.

18 Claims, 12 Drawing Sheets

(56) References Cited

U.S. PATENT DOCUMENTS

| | | | |
|---|---|---|---|
| 2014/0109015 A1* | 4/2014 | Farn | G06F 3/0484 |
| | | | 715/854 |
| 2014/0282338 A1 | 9/2014 | Nayak et al. | |
| 2017/0052864 A1* | 2/2017 | Chen | G06F 13/4022 |
| 2019/0182131 A1* | 6/2019 | Morgan | H04L 43/045 |
| 2020/0403938 A1* | 12/2020 | Wu | H04L 45/74 |

FOREIGN PATENT DOCUMENTS

| | | | | |
|---|---|---|---|---|
| CN | 109542422 A | | 3/2019 | |
| CN | 109981374 A | * | 7/2019 | .............. H04L 1/22 |
| CN | 112104510 A | * | 12/2020 | ......... H04L 41/0631 |
| CN | 110554865 B | | 5/2021 | |
| CN | 109245951 B | * | 9/2021 | ......... H04L 41/0253 |
| CN | 113395183 A | * | 9/2021 | ......... H04L 41/0823 |
| CN | 113723931 A | | 11/2021 | |
| CN | 113890779 A | * | 1/2022 | |

\* cited by examiner

GROUP NODE EDITING METHOD AND APPARATUS

This application claims the benefit of CN application No. 202111551407.X filed on Dec. 17, 2021, the disclosure of which is herein incorporated by reference in its entirety.

TECHNICAL FIELD

The present disclosure relates to the field of software development technology, and in particular, to a group node editing method and apparatus.

BACKGROUND

In the process of graphic programming, in order to reduce the complexity brought by the number of nodes and quickly reuse functions implemented by a plurality of nodes, it is often necessary to combine a plurality of nodes into one node group, and a graphical programming interface displays the node group in a way of one node, while such a node combined with a plurality of nodes is called a group node.

SUMMARY

In order to achieve above objective, embodiments of the present disclosure provide following technical solutions:

In a first aspect, an embodiment of the present disclosure provides a group node editing method, comprising:
  receiving a first operation on a target group node;
  in response to the first operation, displaying a node presentation interface, the node presentation interface including: nodes constituting the target group node, ports on the nodes, and connection relationships between the ports;
  receiving a second operation on an output node in the nodes constituting the target group node, where the second operation is used to add a port on the output node;
  in response to the second operation, adding a first port on the output node, adding a second port corresponding to the first port on the target group node, and setting port types of the first port and the second port to a first type;
  receiving a third operation, where the third operation is used to connect the first port and a third port;
  in response to the third operation, connecting the first port and the third port, and setting the port types of the first port and the second port to a second type, the second type being the port type of the third port.

As an implementation of the embodiment of the present disclosure, after connecting the first port and the third port, and setting the port types of the first port and the second port to the second type, the method further comprises:
  receiving a fourth operation, where the fourth operation is used to connect the first port and a fourth port;
  determining whether the port type of the fourth port is the second type;
  if so, connecting the first port and the fourth port, and keeping the port types of the first port and the second port as the second type;
  if not, outputting prompt information, where the prompt information is used to prompt that the first port and the fourth port are not allowed to be connected.

As an implementation of the embodiment of the present disclosure, after connecting the first port and the fourth port, the method further comprises:
  receiving a fifth operation, where the fifth operation is used to disconnect the first port from the third port or the fourth port;
  in response to the fifth operation, disconnecting the first port from the third port or the fourth port, and keeping the port types of the first port and the second port as the second type.

As an implementation of the embodiment of the present disclosure, after connecting the first port and the fourth port, the method further comprises:
  receiving a sixth operation, where the sixth operation is used to disconnect the first port from the third port and the fourth port;
  in response to the sixth operation, disconnecting the first port from the third port and the fourth port, and setting the port types of the first port and the second port to the first type.

As an implementation of the embodiment of the present disclosure, after connecting the first port and the third port, and setting the port types of the first port and the second port to the second type, the method further comprises:
  receiving a seventh operation, where the seventh operation is used to disconnect the first port from the third port;
  in response to the seventh operation, disconnecting the first port from the third port, and setting the port types of the first port and the second port to the first type.

As an implementation of the embodiment of the present disclosure, after connecting the first port and the third port, and setting the port types of the first port and the second port to the second type, the method further comprises:
  receiving an eighth operation, where the eighth operation is used to connect the second port and the fifth port;
  in response to the eighth operation, connecting the second port and the fifth port, and keeping the port types of the first port and the second port as the second type.

As an implementation of the embodiment of the present disclosure, after connecting the second port and the fifth port, the method further comprises:
  receiving a ninth operation, where the ninth operation is used to disconnect the first port from the third port;
  in response to the ninth operation, disconnecting the first port from the third port, and setting the port types of the first port and the second port to the first type.

As an implementation of the embodiment of the present disclosure, after connecting the second port and the fifth port, the method further comprises:
  receiving a tenth operation, where the tenth operation is used to disconnect the second port from the fifth port;
  in response to the tenth operation, disconnecting the second port from the fifth port, and keeping the port types of the first port and the second port as the second type.

In a second aspect, an embodiment of the present disclosure provides a group node editing apparatus, comprising:
  a user input unit configured to receive a first operation on a target group node;
  a display unit configured to, in response to the first operation, display a node presentation interface, the node presentation interface including: nodes constituting the target group node, ports on the nodes, and connection relationships between the ports;
  the user input unit is further configured to receive a second operation on an output node in the nodes constituting the target group node, where the second operation is used to add a port on the output node;

a port adding unit configured to, in response to the second operation, add a first port on the output node, add a second port corresponding to the first port on the target group node, and set port types of the first port and the second port to a first type;

the user input unit is further configured to receive a third operation, where the third operation is used to connect the first port and a third port;

a processing unit configured to, in response to the third operation, connect the first port and the third port, and set the port types of the first port and the second port to a second type, the second type being the port type of the third port.

As an implementation of the embodiment of the present disclosure, the user input unit is further configured to, after connecting the first port and the third port and setting the port types of the first port and the second port to the second type, receive a fourth operation, where the fourth operation is used to connect the first port and a fourth port;

the processing unit is further configured to determine whether the port type of the fourth port is the second type; if so, connect the first port and the fourth port, and keep the port types of the first port and the second port as the second type; if not, output prompt information, where the prompt information is used to prompt that the first port and the fourth port are not allowed to be connected.

As an implementation of the embodiment of the present disclosure, the user input unit is further configured to, after connecting the first port and the fourth port, receive a fifth operation, where the fifth operation is used to disconnect the first port from the third port or the fourth port;

the processing unit is further configured to, in response to the fifth operation, disconnect the first port from the third port or the fourth port, and keep the port types of the first port and the second port as the second type.

As an implementation of the embodiment of the present disclosure, the user input unit is further configured to, after connecting the first port and the fourth port, receive a sixth operation, where the sixth operation is used to disconnect the first port from the third port and the fourth port;

the processing unit is further configured to, in response to the sixth operation, disconnect the first port from the third port and the fourth port, and set the port types of the first port and the second port as the first type.

As an implementation of the embodiment of the present disclosure, the user input unit is further configured to, after connecting the first port and the third port and setting the port types of the first port and the second port to the second type, receive a seventh operation, where the seventh operation is used to disconnect the first port from the third port;

the processing unit is further configured to, in response to the seventh operation, disconnect the first port from the third port, and set the port types of the first port and the second port to the first type.

As an implementation of the embodiment of the present disclosure, the user input unit is further configured to, after connecting the first port and the third port and setting the port types of the first port and the second port to the second type, receive an eighth operation, where the eighth operation is used to connect the second port and the fifth port;

the processing unit is further configured to, in response to the eighth operation, connect the second port and the fifth port, and keep the port types of the first port and the second port as the second type.

As an implementation of the embodiment of the present disclosure, the user input unit is further configured to, after connecting the second port and the fifth port, receive a ninth operation, where the ninth operation is used to disconnect the first port from the third port;

the processing unit is further configured to, in response to the ninth operation, disconnect the first port from the third port, and set the port types of the first port and the second port to the first type.

As an implementation of the embodiment of the present disclosure, the user input unit is further configured to, after connecting the second port and the fifth port, receive a tenth operation, where the tenth operation is used to disconnect the second port from the fifth port;

the processing unit is further configured to, in response to the tenth operation, disconnect the second port from the fifth port, and keep the port types of the first port and the second port as the second type.

In a third aspect, an embodiment of the present disclosure provides an electronic device, comprising: a memory and a processor, where the memory is configured to store a computer program; the processor is configured to, when invoking the computer program, cause the electronic device to implement the group node editing method according to the first aspect or any of implementations of the first aspect.

In a fourth aspect, an embodiment of the present disclosure provides a computer-readable storage medium, when the computer program is executed by a computing device, causes the computing device to implement the group node editing method according to the first aspect or any of implementations of the first aspect.

In a fifth aspect, an embodiment of the present disclosure provides a computer program product, which, when runs on a computer, causes the computer to implement the group node editing method according to the first aspect or any of implementations of the first aspect.

The group node editing method provided by the embodiment of the present disclosure firstly receives a first operation on a target group node, and displays, in response to the first operation, a node presentation interface including nodes constituting the target group node, ports on the nodes, connection relationships between the ports; then receives a second operation on an output node in the nodes constituting the target group node, and in response to the second operation, adds a first port on the output node, adds a second port corresponding to the first port on the target group node, and sets port types of the first port and the second port to a first type, and then receives a third operation for connecting the first port and a third port, and in response to the third operation, connects the first port and the third port, and sets the port types of the first port and the second port to the port type of the third port. Compared with the prior art, which, when adding a port to a group node, it needs to be ungrouped, edited, and regrouped again, the group node editing method provided by the embodiment of the present disclosure can directly edit a target group node to add a port to the target group node, without the need to perform ungrouping and regrouping operations on the target group node first. Therefore, the group node editing method provided by the embodiment of the present disclosure can simplify operations in the process of adding a port to a group node.

BRIEF DESCRIPTION OF THE DRAWINGS

The accompanying drawings, which are incorporated in and constitute a part of this specification, illustrate embodiments consistent with the present disclosure and serve to explain principles of the disclosure together with the specification.

In order to more clearly illustrate technical solutions in the embodiments of the present disclosure or the prior art, the accompanying drawings that need to be used in the description of the embodiments or the prior art will be introduced briefly follow. Apparently, for those of ordinary skilled in the art, other drawings can also be obtained from these drawings without any creative effort.

DETAILED DESCRIPTION

Figure 1:
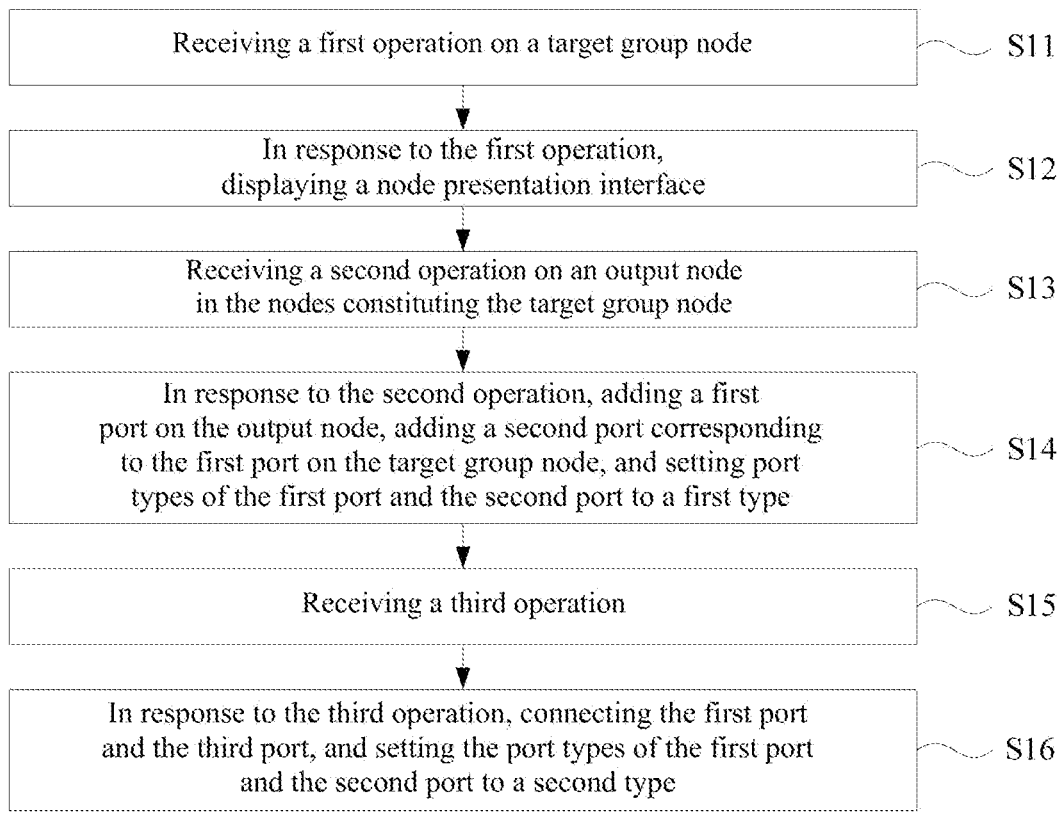
FIG. 1 is a flowchart of steps of a group node editing method provided by an embodiment of the present disclosure.

In order to more clearly understand above objects, features and advantages of the present disclosure, the solution of the present disclosure will be further described below. It should be noted that embodiments of the present disclosure and features in the embodiments may be combined with each other without conflict.

Many specific details are set forth in the following description to facilitate a full understanding of the present disclosure, but the present disclosure can also be implemented in other ways different from those described herein; obviously, the embodiments in the specification are only a part, not all, of embodiments of the present disclosure.

It should be noted that, in order to clearly describe the technical solutions of the embodiments of the present disclosure, in the embodiments of the present disclosure, words such as "first" and "second" are used to distinguish between the same or similar items that have basically the same function and effect and those skilled in the art can understand that words such as "first" and "second" do not have limitations on the quantity and execution order. For example, a first feature image set and a second feature image set are only for distinguishing between different feature image sets, rather than limiting sequences of the feature image sets and so on.

In the embodiments of the present disclosure, words such as "exemplary" or "for example" are used to mean serving as an example, exemplification or illustration. Any embodiments or design solutions described as "exemplary" or "for example" in the embodiments of the present disclosure should not be construed as preferred or advantageous over other embodiments or design solutions. More exactly, the use of words such as "exemplary" or "such as" is intended to present related concepts in a specific manner. In addition, in the description of the embodiments of the present disclosure, the meaning of "a plurality of" refers to two or more, unless otherwise specified.

Although group nodes can greatly reduce the complexity brought by the number of nodes and be reused quickly, existing technologies do not support direct editing to group nodes. When it is necessary to add a port to a group node to expand functions implemented by the group node, editing method in the prior art is: first performing an ungrouping operation on the group node, expanding the group node into individual nodes constituting the group node, and then editing the number and type of ports of one or more nodes therein, and finally performing a grouping operation on the modified plurality of nodes to regroup the plurality of nodes into one group node. As mentioned above, in the prior art, when adding a port to a group node, it needs to be ungrouped, edited, and regrouped again, in which these steps are cumbersome, and when the number of nodes inside the group node is large and grouping details are more complicated, it is also quite prone to error.

In view of this, the present disclosure provides a group node editing method and apparatus, for simplifying operations in the process of adding a port to the group node.

Based on above, an embodiment of the present disclosure provides a group node editing method. Referring to FIG. 1, the group node editing method provided by an embodiment of the present disclosure comprises following steps:

S11. Receiving a first operation on a target group node.

The target group node in an embodiment of the present disclosure may be any group node in graphical programming software, and the first operation may be any operation for viewing information of the target group node. For example, the first operation in the embodiment of the present disclosure may be a click operation by a user on the target group node, or a voice command input by the user, or a specific gesture input by the user.

In some embodiments of the present disclosure, the specific gesture may be any one of a single-click gesture, a sliding gesture, a pressure recognition gesture, a long-press gesture, an area change gesture, a double-press gesture, and a double-click gesture.

S12. In response to the first operation, displaying a node presentation interface.

Wherein, the node presentation interface includes: nodes constituting the target group node, ports on the nodes, and connection relationships between the ports.

It should be noted that, different from a display interface after performing an ungrouping operation on the target group node, the node presentation interface in the embodiment of the present disclosure is an interface for displaying individual nodes constituting the target group node, ports on individual nodes and connection relationships between individual ports, and displaying the node presentation interface will not perform ungrouping operation on the target group node.

In some embodiments, the method for displaying the node presentation interface may be: displaying the node presentation interface in a preset area of the interface for displaying the target group node, or displaying the node presentation interface by means of a floating window, or creating a new content presentation interface to present the node presentation interface, which is not limited in the embodiments of the present disclosure, as long as the node presentation interface can be displayed.

Figure 2:
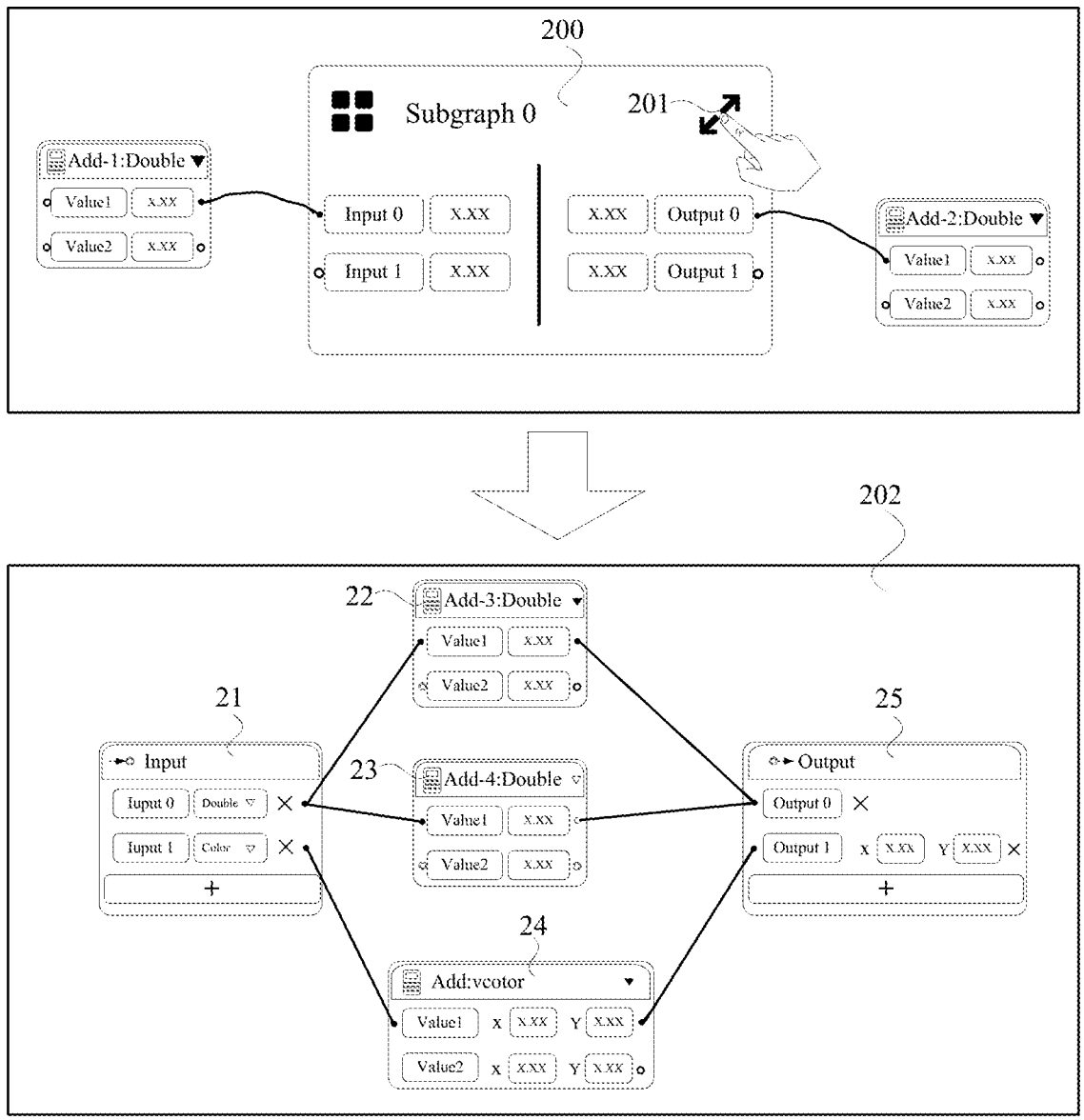
FIG. 2 is a first scenario interface diagram of a group node editing method provided by an embodiment of the present disclosure.

Exemplarily, referring to FIG. 2, as shown in FIG. 2, taking the target group node 200 including a control 201 for triggering display of the node presentation interface and the first operation being an operation on the control 201 as an example. As shown in FIG. 2, when receiving an operation by a user on the control 201 (a first operation), in response to the operation of the user on the control 201, a node presentation interface 202 is displayed, and the node presentation interface 202 includes an input node 21, a node 22, a node 23, a node 24, an output node 25 constituting the target group node, ports on the nodes, and connection relationships between the ports.

S13. Receiving a second operation on an output node in the nodes constituting the target group node.

Wherein, the second operation is used to add a port on the output node.

In an embodiment of the present disclosure, the type of the second operation is not limited, as long as the second operation can trigger the addition of a port on the output node. Exemplarily, the second operation is a touch and click operation on the output node.

S14. In response to the second operation, adding a first port on the output node, adding a second port corresponding to the first port on the target group node, and setting port types of the first port and the second port to a first type.

The first port and the second port in an embodiment of the present disclosure are ports whose type can be changed. The first port and the second port may be defined by enumerating port types at a bottom layer, and the first type may be a general type (GENERAL).

Figure 3:
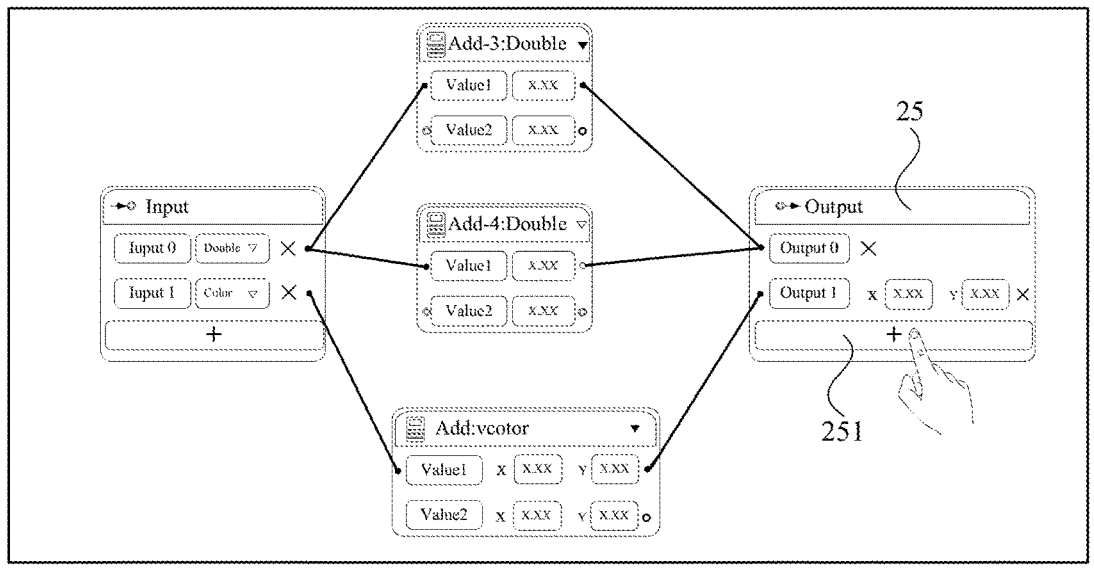
FIG. 3 is a second scenario interface diagram of a group node editing method provided by an embodiment of the present disclosure.
Figure 3:
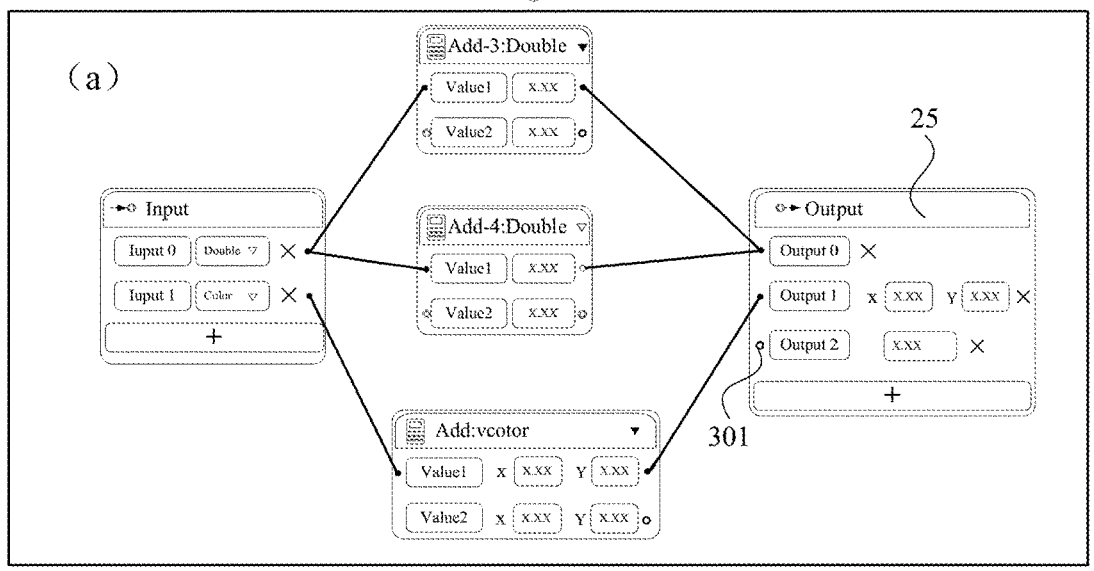
Figure 3:
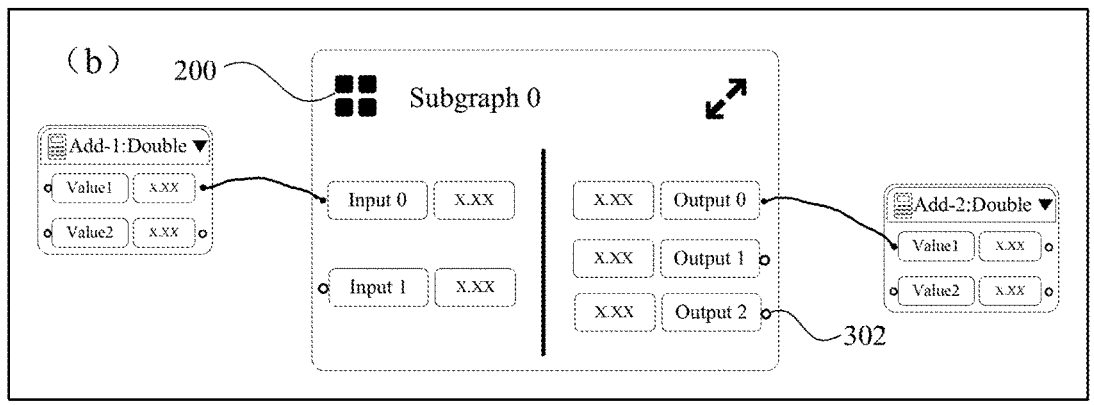

Exemplarily, referring to FIG. 3, as shown in FIG. 3, taking the output node 25 constituting the target group node including a control 251 for triggering the addition of a port and the second operation being an operation on the control 251 as an example. When receiving the operation by a user on the control 251 on the output node 25 (second operation), as shown in FIG. 3(a), a first port 301 is added to the output node 25, as shown in FIG. 3(b), a second port 302 corresponding to the first port is added on the target group node 200. The port type settings of the first port 301 and the second port 302 are both the first type.

S15. Receiving a third operation.

Wherein, the third operation is used to connect the first port and a third port.

In an embodiment of the present disclosure, the type of the third operation is not limited, as long as the third operation can trigger the connection of the first port and the third port. Exemplarily, the third operation may be an operation of sliding from the first port to the third port.

S16. In response to the third operation, connecting the first port and the third port, and setting the port types of the first port and the second port to a second type.

Wherein, the second type is the port type of the third port.

Figure 4:
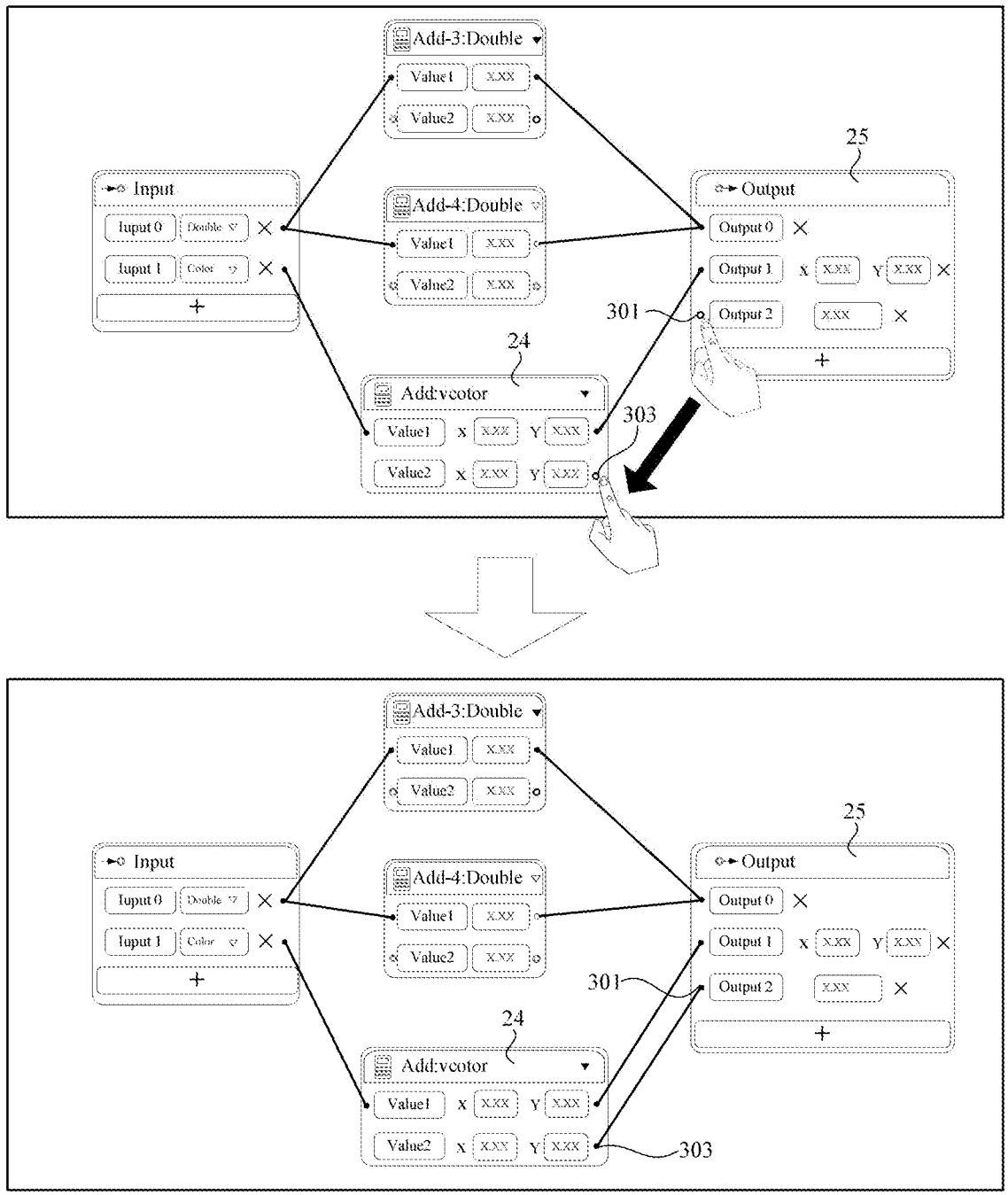
FIG. 4 is a third scenario interface diagram of a group node editing method provided by an embodiment of the present disclosure.

Exemplarily, referring to FIG. 4, as shown in FIG. 4, taking the third port being the port 303 on the node 24 and the third operation being the sliding from the first port 301 on the output node 25 to the port 303 on the node 24 as an example. As shown in FIG. 4, when receiving an operation of sliding from the first port 301 to the third port 303 (third operation) input by a user, the first port 301 and the third port 303 are connected, and the port types of the first port 301 and the second port are set to the port type of the third port 303.

The group node editing method provided by the embodiment of the present disclosure firstly receives a first operation on a target group node, and displays, in response to the first operation, a node presentation interface including nodes constituting the target group node, ports on the nodes, connection relationships between the ports; then receives a second operation on an output node in the nodes, and in response to the second operation, adds a first port on the output node, adds a second port corresponding to the first port on the target group node, and sets port types of the first port and the second port to a first type, and then receives a third operation for connecting the first port and a third port, and in response to the third operation, connects the first port and the third port, and sets the port types of the first port and the second port to the port type of the third port. Compared with the prior art, which, when adding a port to a group node, it needs to be ungrouped, edited, and regrouped again, the group node editing method provided by the embodiment of the present disclosure can directly edit a target group node to add a port to the target group node, without the need to perform ungrouping and regrouping operations on the target group node first. Therefore, the group node editing method provided by the embodiment of the present disclosure can simplify operations in the process of adding a port to a group node.

An application scenario of the group node editing method provided by an embodiment of the present disclosure comprises: in the process of special effects editing, realizing a special effect of automatically applying makeup for an input photo by means of node-based visual programming, and the group node for realizing the special effect is group node A. In the process of subsequent usage, if the function realized by group node A is intended to be expanded to add earrings while applying makeup automatically, the function expansion needs to add an output port for group node A, and at this time, the group node editing method provided by the embodiment of the present disclosure can be used to edit group node A, and directly add a port on the output node in the nodes constituting the group node A, and connect the newly added ports without first performing an ungrouping operation on the group node A, and then editing the number and type of ports of one or more nodes therein, and finally performing a grouping operation on the modified plurality of nodes.

As an implementation of the embodiment of the present disclosure, the group node editing method provided by an embodiment of the present disclosure further comprises following steps a to d:

Step a. receiving a fourth operation.

Wherein, the fourth operation is used to connect the first port and a fourth port.

In an embodiment of the present disclosure, the type of the fourth operation is not limited, as long as the fourth operation can trigger the connection between the first port and the fourth port. Exemplarily, the fourth operation may be an operation of sliding from the first port to the fourth port.

Step b. determining whether the port type of the fourth port is the second type.

That is, determining whether the port type of the fourth port is the same as the port (third port) connected to the first port or the port type of the current first port.

In above step b, if the port type of the fourth port is the second type, following step c is performed.

Step c. connecting the first port and the fourth port, and keeping the port types of the first port and the second port as the second type.

Figure 5:
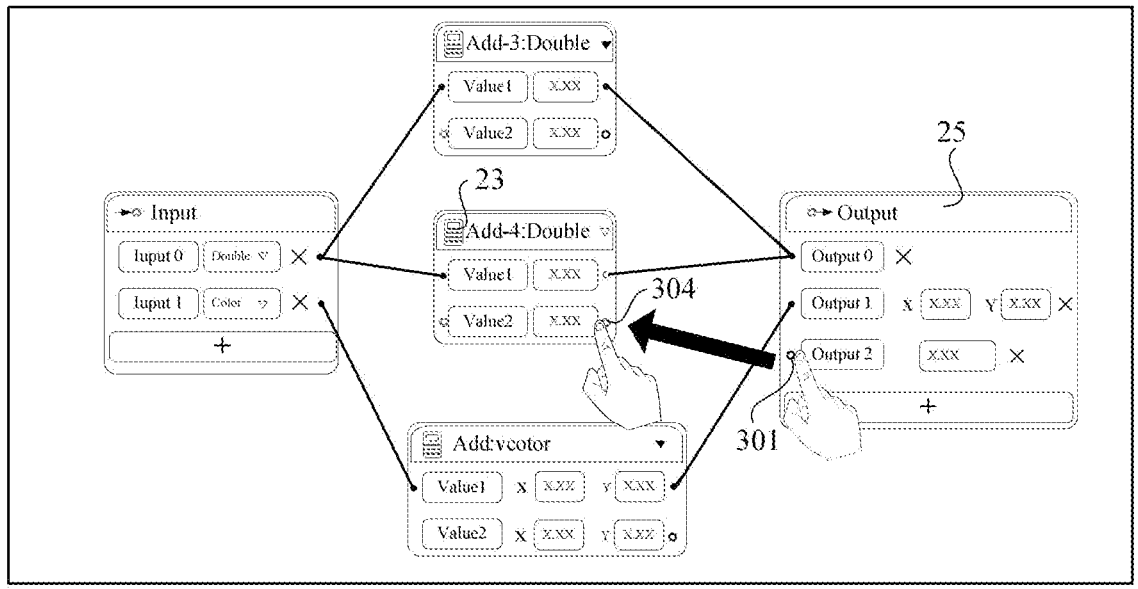
FIG. 5 is a fourth scenario interface diagram of a group node editing method provided by an embodiment of the present disclosure.
Figure 5:
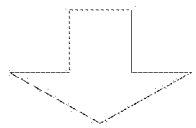
Figure 5:
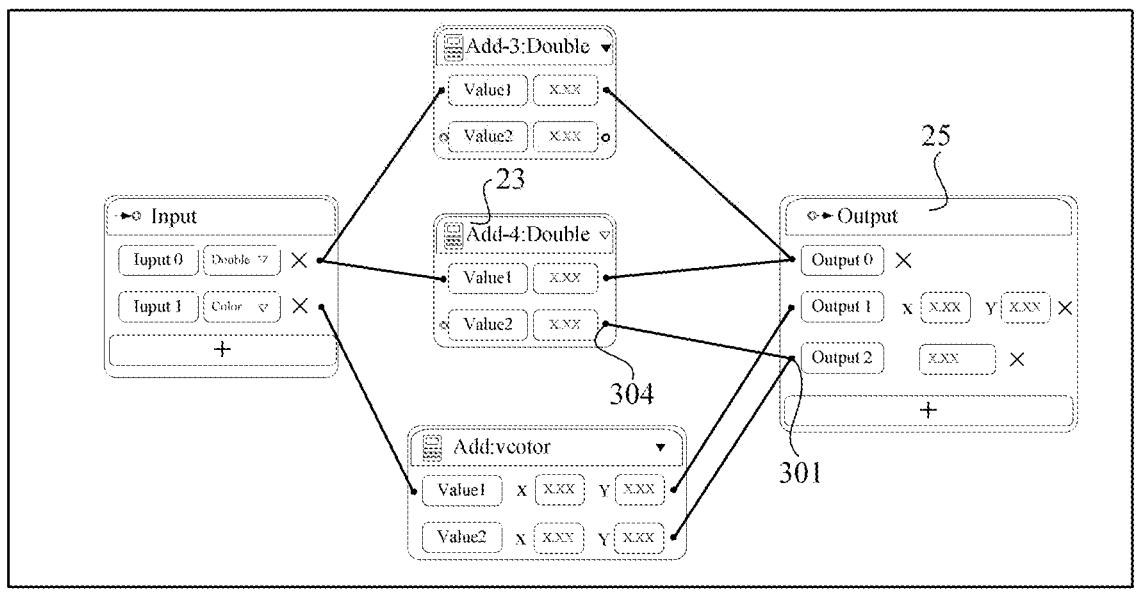

Exemplarily, referring to FIG. 5, as shown in FIG. 5, taking the fourth port being the port 304 on the node 23 and the fourth operation being the sliding from the first port 301 on the output node 25 to the port 304 on the node 23 as an example. As shown in FIG. 5, when receiving an operation of sliding from the first port 301 to the fourth port 304 (third operation) input by a user, the first port 301 and the fourth port 304 are connected, and the port type of the first port 301 is kept as the second type.

In above step b, if the port type of the fourth port is not the second type, following step d is performed.

Step d, outputting prompt information.

Wherein, the prompt information is used to prompt that the first port and the fourth port are not allowed to be connected.

Figure 6:
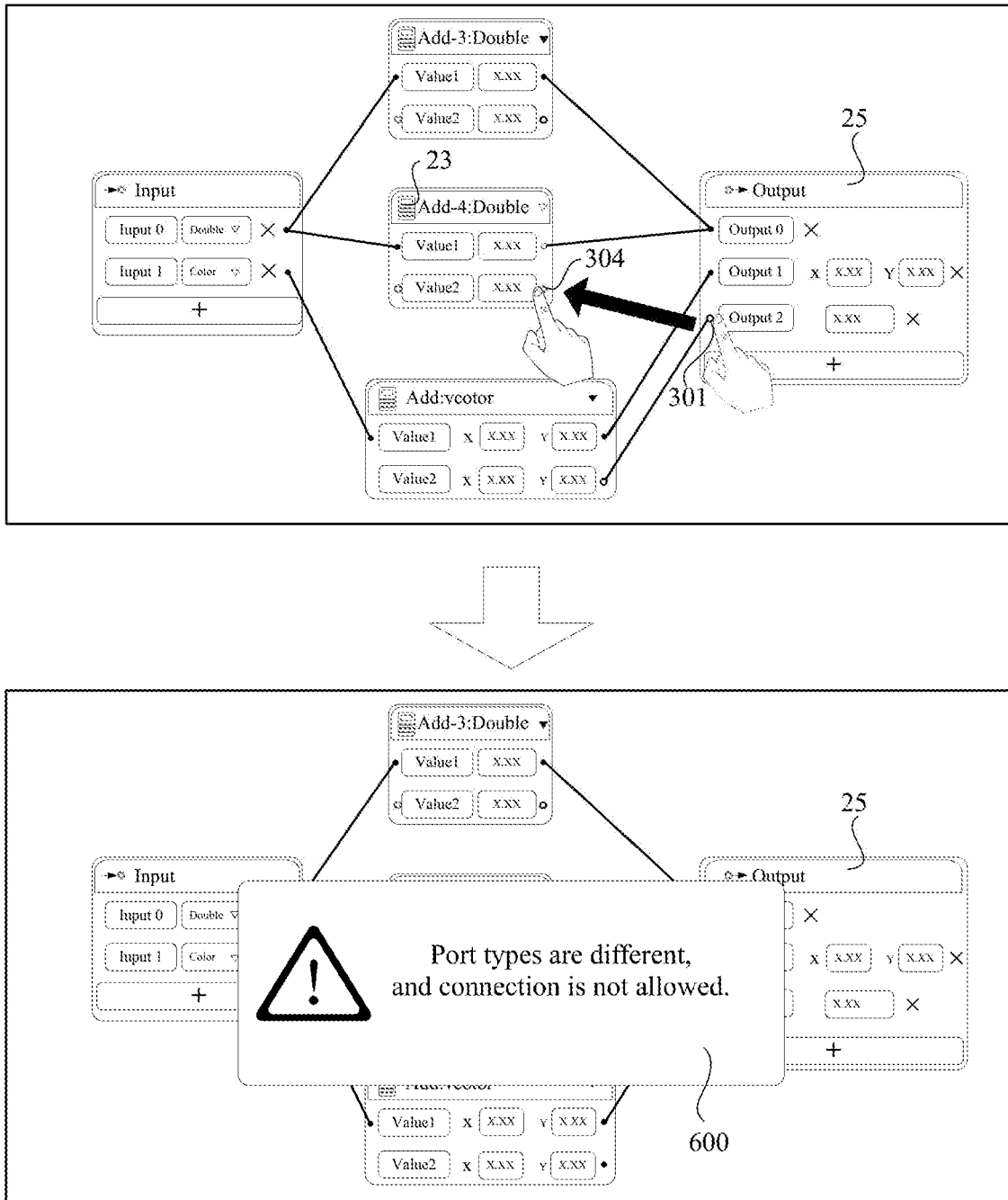
FIG. 6 is a fifth scenario interface diagram of a group node editing method provided by an embodiment of the present disclosure.

Exemplarily, referring to FIG. 6, as shown in FIG. 6, taking the fourth port being the port 304 on the node 23 and the fourth operation being the sliding from the first port 301 on the output node 25 to the port 304 on the node 23 as an example. As shown in FIG. 6, when receiving an operation of sliding from the first port 301 to the fourth port 304 (third operation) input by a user, the prompt information 600 is output in a way of a window, and content of the prompt information 600 is "Port types are different, and connection is not allowed".

As an implementation of the embodiment of the present disclosure, after above step c (after connecting the first port and the fourth port), the group node editing method provided by an embodiment of the present disclosure further comprises:

receiving a fifth operation, where the fifth operation is used to disconnect the first port from the third port or the fourth port;

in response to the fifth operation, disconnecting the first port from the third port or the fourth port, and keeping the port types of the first port and the second port as the second type.

That is, when the first port is connected to a plurality of ports, if an operation to disconnect some of the connections is received, the corresponding connections are disconnected, and the port type of the first port is kept unchanged.

Figure 7:
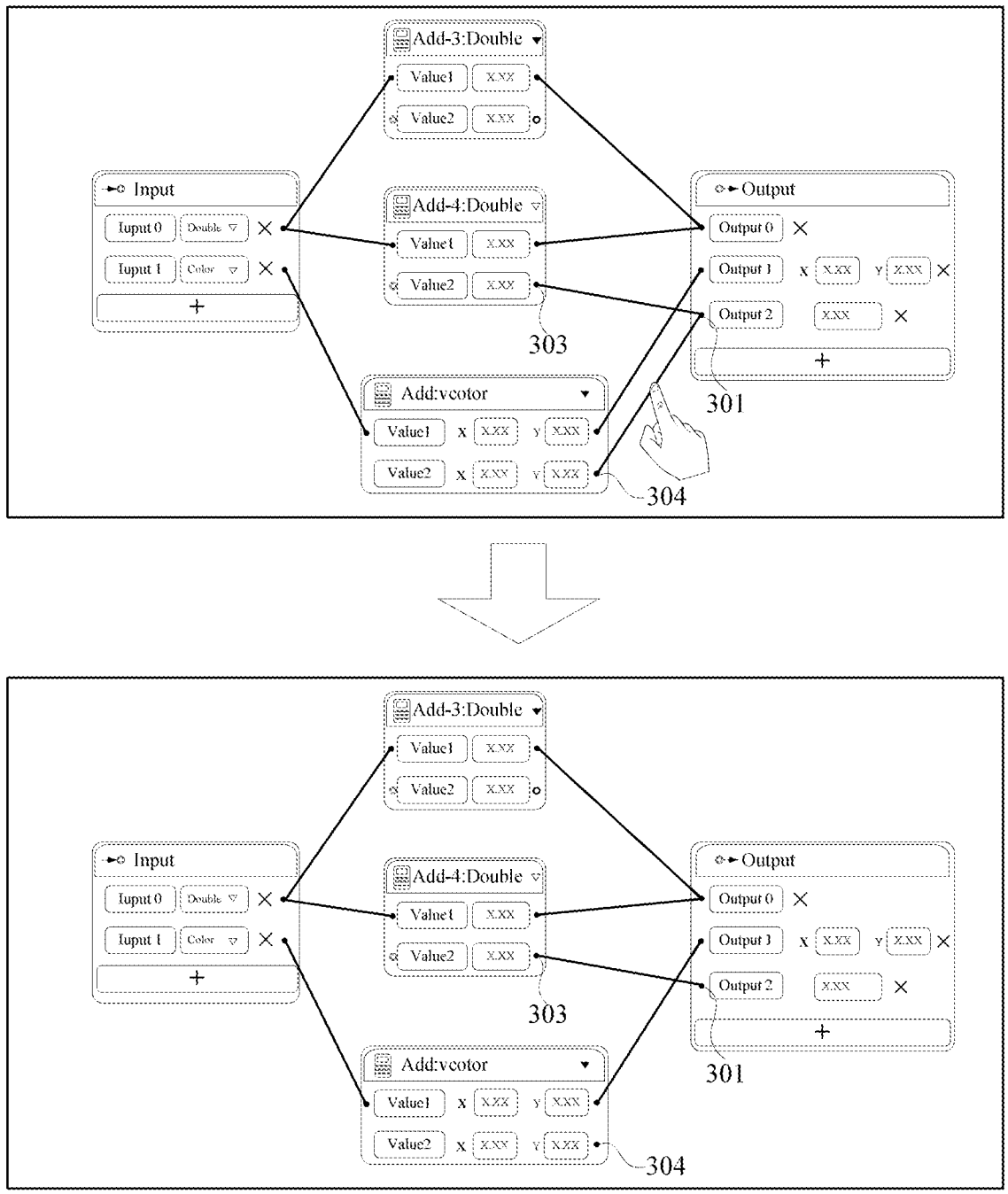
FIG. 7 is a sixth scenario interface diagram of a group node editing method provided by an embodiment of the present disclosure.

Exemplarily, referring to FIG. 7, as shown in FIG. 7, taking the fifth operation being a double-click operation input on the connection line between the first port 301 and the fourth port 304 and the fifth operation being used to disconnect the first port 301 from the fourth port 304 as an example. As shown in FIG. 7, when receiving a double-click operation (fifth operation) input by a user on the connection line between the first port 301 and the fourth port 304, the first port 301 is disconnected from the fourth port 304, and the port type of the first port is kept unchanged (still the port type of the third port, the second type).

As an optional implementation of the embodiment of the present disclosure, after above step c (after connecting the first port and the fourth port), the group node editing method provided by an embodiment of the present disclosure further comprises:

receiving a sixth operation, where the sixth operation is used to disconnect the first port from the third port and the fourth port;

In response to the sixth operation, disconnecting the first port from the third port and the fourth port, and setting the port types of the first port and the second port to the first type.

That is, when the first port is connected to a plurality of ports, if an operation to disconnect all connections is received, all connections are disconnected, and the port types of the first port and the second port are set as a default port type (first type).

Figure 8:
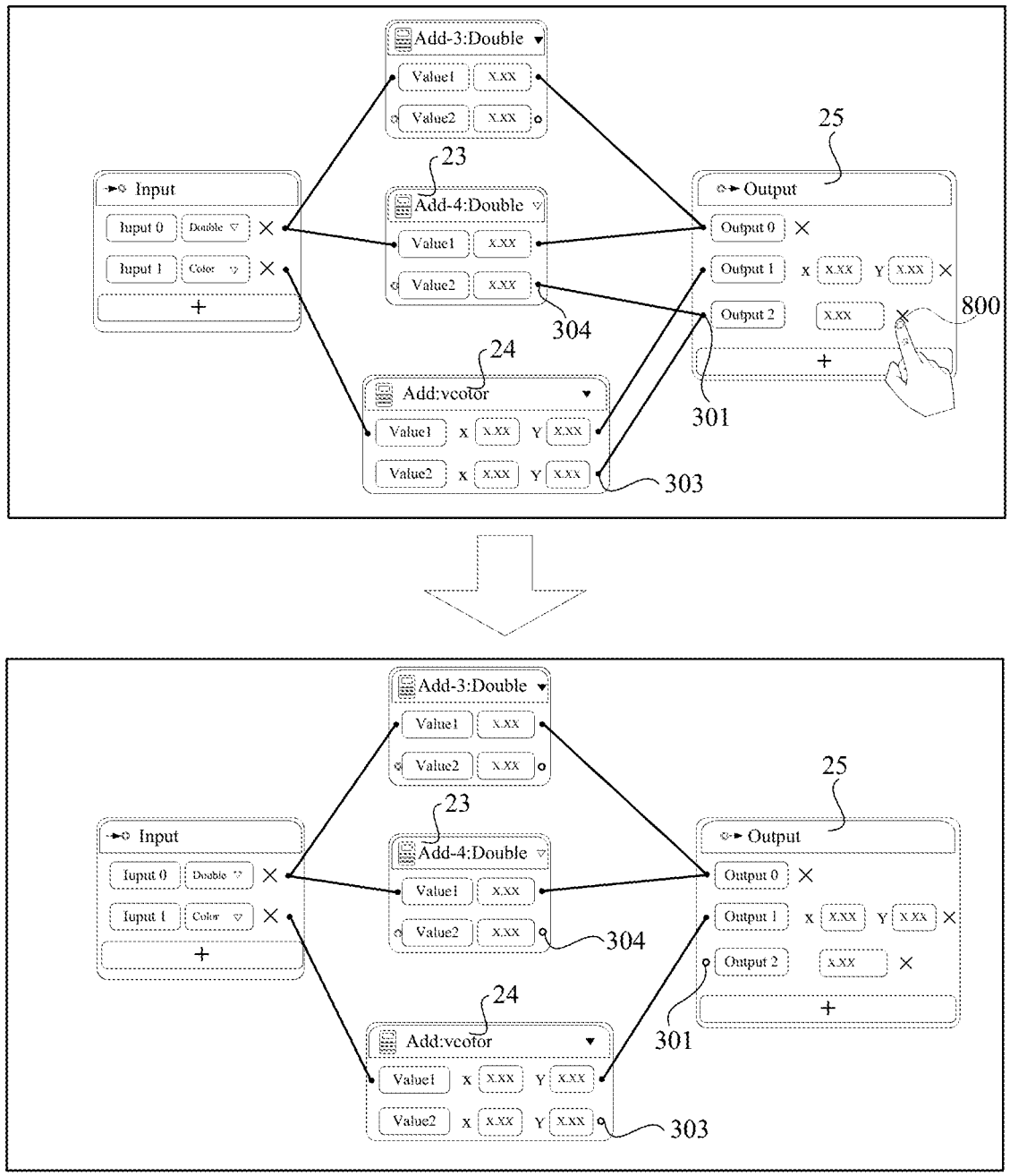
FIG. 8 is a seventh scenario interface diagram of a group node editing method provided by an embodiment of the present disclosure.

Exemplarily, referring to FIG. 8, as shown in FIG. 8, taking the sixth operation being a click operation on the control 800 on the output node 25 for disconnecting all connections on the first port 301 as an example. As shown in FIG. 8, when receiving a click operation (sixth operation) input by a user on the control 800, the first port 301 is disconnected from the third port 303, and the first port 301 is disconnected from the fourth port 304, and the port types of the first port and the second port are set to the first type.

As an implementation of the embodiment of the present disclosure, after above step S106 (connecting the first port and the third port, and setting the port types of the first port and the second port to the second type), the group node editing method provided by an embodiment of the present disclosure further comprises:

receiving a seventh operation, where the seventh operation is used to disconnect the first port from the third port;

in response to the seventh operation, disconnecting the first port from the third port, and setting the port types of the first port and the second port to the first type.

That is, when the first port is only connected to one port, if an operation to disconnect the connection is received, the connection is disconnected, and the port types of the first port and the second port are set as the default port type (first type).

Figure 9:
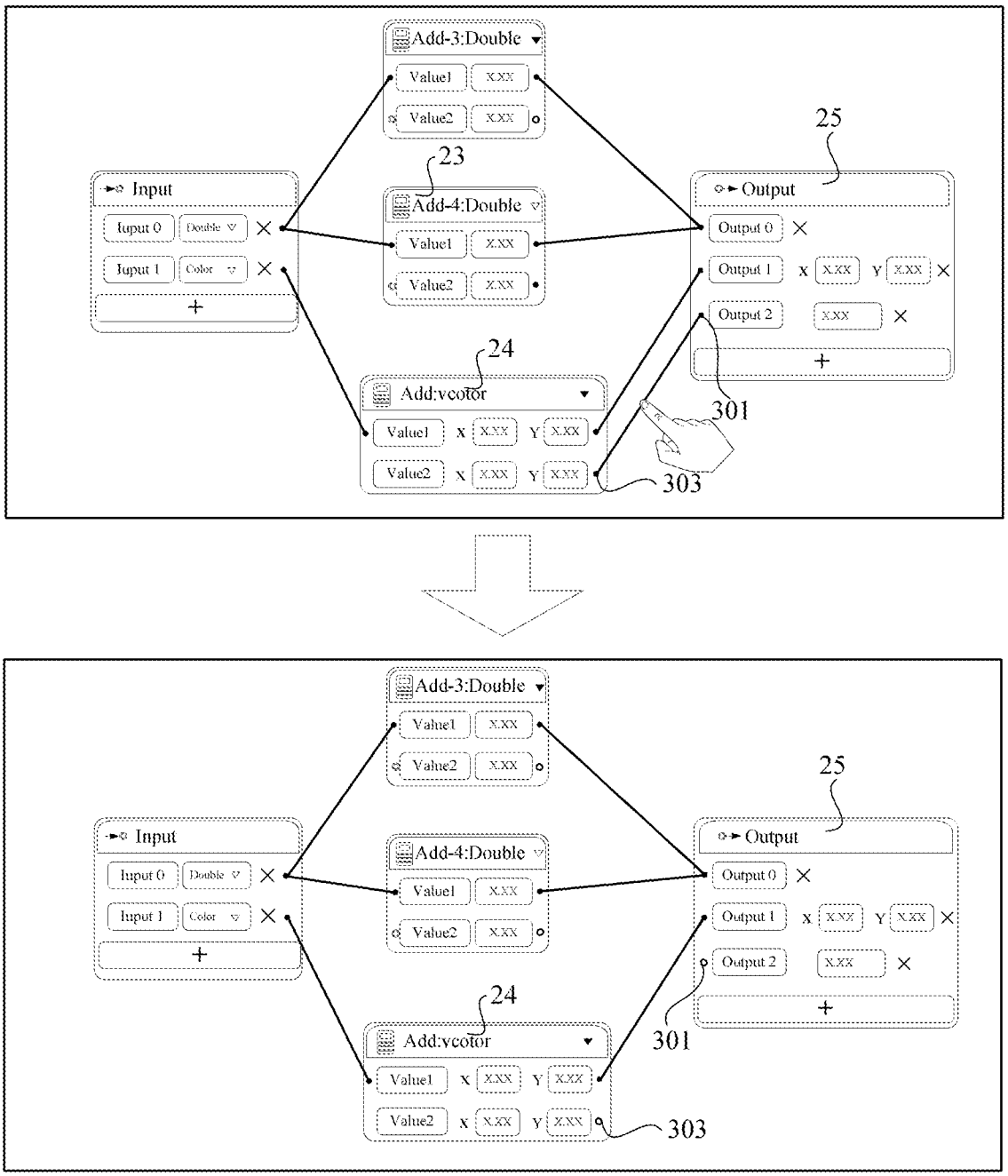
FIG. 9 is an eighth scenario interface diagram of a group node editing method provided by an embodiment of the present disclosure.

Exemplarily, referring to FIG. 9, as shown in FIG. 9, taking the seventh operation being a double-click operation input on the connection line between the first port 301 on the output node 25 and the third port 303 on the node 24 as an example. As shown in FIG. 9, when receiving a double-click operation (seventh operation) input by a user on the connection line between the first port 301 and the third port 303, the first port 301 is disconnected from the third port 303, and the port types of the first port and the second port are set to the first type.

As an implementation of the embodiment of the present disclosure, after above step S106 (connecting the first port and the third port, and setting the port types of the first port and the second port to the second type), the group node editing method provided by an embodiment of the present disclosure further comprises:

receiving an eighth operation, where the eighth operation is used to connect the second port and a fifth port;

in response to the eighth operation, connecting the second port and the fifth port, and keeping the port types of the first port and the second port as the second type.

That is, if an operation to connect the second port and other ports is received, the second port and corresponding port are connected, and the port types of the first port and the second port are kept unchanged (still the port type of the third port, second type).

Figure 10:
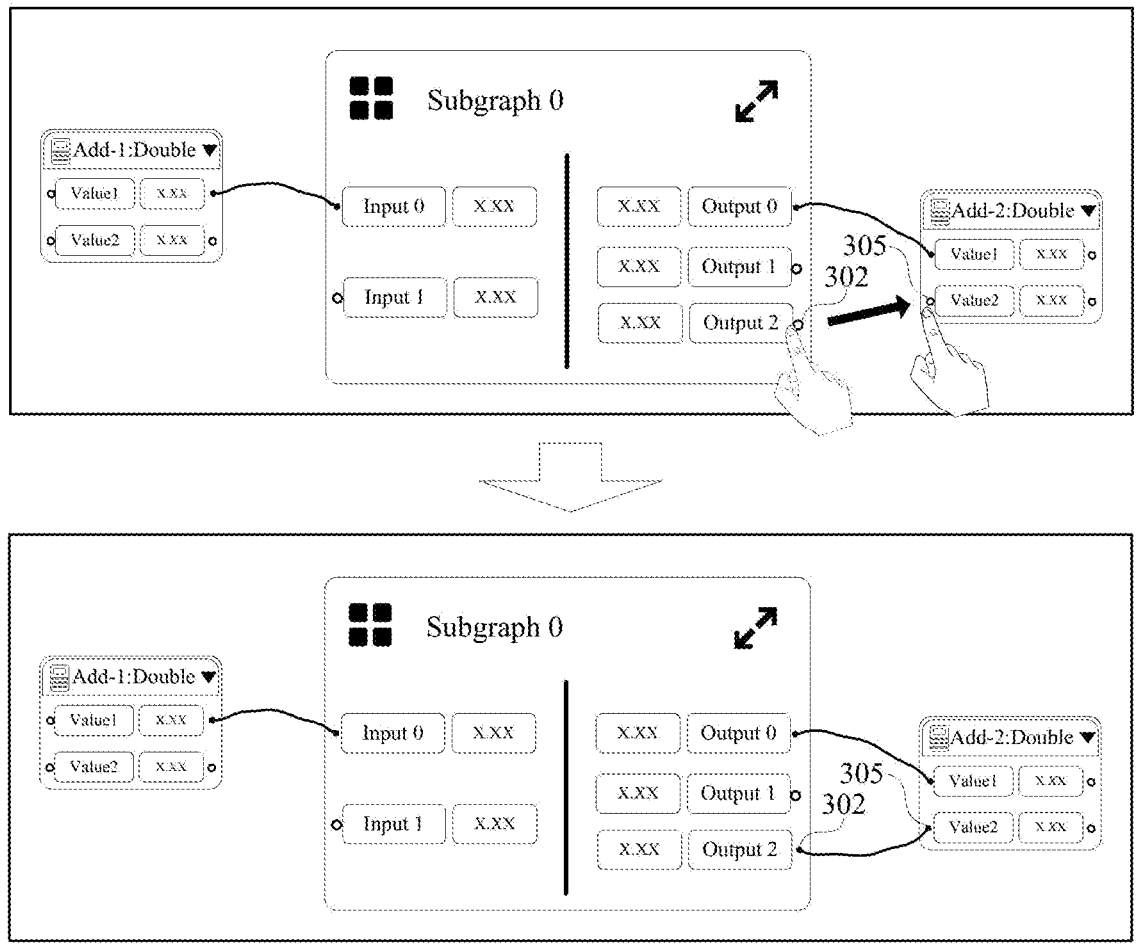
FIG. 10 is a ninth scenario interface diagram of a group node editing method provided by an embodiment of the present disclosure.

Exemplarily, referring to FIG. 10, as shown in FIG. 10, taking the fifth port 305 being a port on a node outside the target group node and the eighth operation being an operation of sliding from the second port 302 on the target group node 200 to the fifth ports 305 as an example. As shown in FIG. 10, when receiving an operation of sliding from the second port 302 to the fifth port 305 (the eighth operation) input by a user, the second port 301 and the fifth port 305 are connected, and the port types of the first port and the second port are kept as the second type.

As an implementation of the embodiment of the present disclosure, after the connected second port and the fifth port are connected, the group node editing method provided by an embodiment of the present disclosure further comprises:

receiving a ninth operation, where the ninth operation is used to disconnect the first port from the third port;

in response to the ninth operation, disconnecting the first port from the third port, and setting the port types of the first port and the second port to the first type.

That is, the connection of the second port to other port does not affect the port types of the first port and the second port. The port types of the first port and the second port are determined by the port to which the first port is connected. If the first port is connected to other port, the port types of the first port and the second port are the type of the port to which the first port is connected. If the first port is not connected to other ports, the port types of the first port and the second port is the default first type.

As an implementation of the embodiment of the present disclosure, after the connected second port and the fifth port are connected, the group node editing method provided by an embodiment of the present disclosure further comprises:

receiving a tenth operation, where the tenth operation is used to disconnect the second port from the fifth port;

in response to the tenth operation, disconnecting the second port from the fifth port, and keeping the port types of the first port and the second port as the second type.

That is, the disconnection of the second port from other ports does not affect the port types of the first port and the second port. The port types of the first port and the second port are determined by the port to which the first port is connected. If the first port is connected to other port, the port type of the first port and the second port is the type of the port to which the first port is connected. If the first port is not connected to other port, the port types of the first port and the second port are the default first type.

Figure 11:
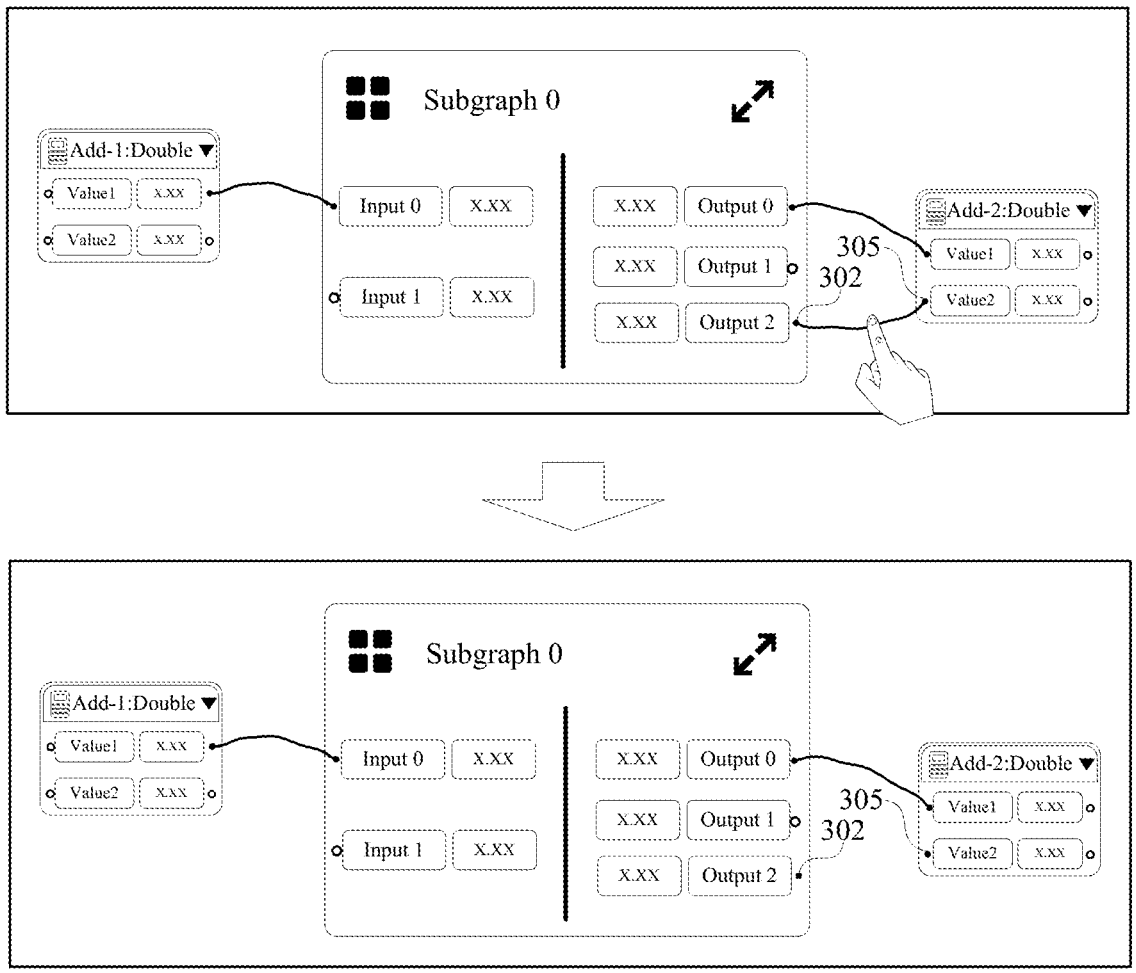
FIG. 11 is a tenth scenario interface diagram of a group node editing method provided by an embodiment of the present disclosure.

Exemplarily, referring to FIG. 11, as shown in FIG. 11, taking the fifth port being the port 305 on the node 101 outside the target group node and the tenth operation being a touch and click operation on the connection line between the second port 302 to the fifth port 305 as an example. As shown in FIG. 11, when receiving a touch and click operation (tenth operation) on the connection line between the second port 302 and the fifth port 305 input by the user, the second port 301 is disconnected from the fifth port 305, and the port types of the first port and the second port are kept as the second type.

Based on the same inventive concept, as an implementation of above method, an embodiment of the present disclosure further provides a group node editing apparatus. The apparatus embodiment corresponds to the foregoing method embodiment. For ease of reading, the apparatus embodiment will not repeat the detail contents in the foregoing method embodiment one by one, but it should be clear that the group node editing apparatus in the embodiment can correspondingly implement all the contents in the foregoing method embodiment.

Figure 12:
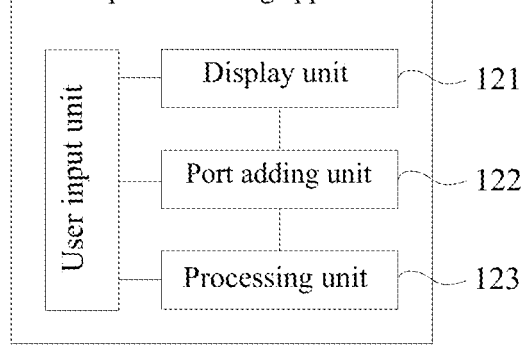
FIG. 12 is a schematic diagram of a group node editing apparatus provided by an embodiment of the present disclosure.

An embodiment of the present disclosure provides a group node editing apparatus. FIG. 12 is a schematic structural diagram of the group node editing apparatus. As shown in FIG. 12, the group node editing apparatus 120 comprises:

a user input unit 121 configured to receive a first operation on a target group node;

a display unit 122 configured to, in response to the first operation, display a node presentation interface, the node presentation interface including: nodes constituting the target group nodes, ports on the nodes, and connection relationships between the ports;

the user input unit 121 is further configured to receive a second operation on an output node in the nodes constituting the target group node, where the second operation is used to add a port on the output node;

a port adding unit 123 configured to, in response to the second operation, add a first port on the output node, add a second port corresponding to the first port on the target group node, and set port types of the first port and the second port to a first type;

the user input unit 121 is further configured to receive a third operation, where the third operation is used to connect the first port and a third port;

a processing unit 124 configured to, in response to the third operation, connect the first port and the third port, and set the port types of the first port and the second port to a second type, the second type being the port type of the third port.

As an implementation of the embodiment of the present disclosure, the user input unit 121 is further configured to, after connecting the first port and the third port and setting the port types of the first port and the second port to the second type, receive a fourth operation, where the fourth operation is used to connect the first port and a fourth port;

the processing unit 124 is further configured to determine whether the port type of the fourth port is the second type; if so, connect the first port and the fourth port, and keep the port types of the first port and the second port as the second type; if not, output prompt information, where the prompt information is used to prompt that the first port and the fourth port are not allowed to be connected.

As an implementation of the embodiment of the present disclosure, the user input unit 121 is further configured to, after connecting the first port and the fourth port, receive a fifth operation, where the fifth operation is used to disconnect the first port from the third port or the fourth port;

the processing unit 124 is further configured to, in response to the fifth operation, disconnect the first port from the third port or the fourth port, and keep the port types of the first port and the second port as the second type.

As an implementation of the embodiment of the present disclosure, the user input unit 121 is further configured to, after connecting the first port and the fourth port, receive a sixth operation, where the sixth operation is used to disconnect the first port from the third port and the fourth port;

the processing unit 124 is further configured to, in response to the sixth operation, disconnect the first port from the third port and the fourth port, and set the port types of the first port and the second port to the first type.

As an implementation of the embodiment of the present disclosure, the user input unit 121 is further configured to, after connecting the first port and the third port and setting the port types of the first port and the second port to the second type, receive a seventh operation, where the seventh operation is used to disconnect the first port from the third port;

the processing unit 124 is further configured to, in response to the seventh operation, disconnect the first port from the third port, and set the port types of the first port and the second port to the first type.

As an implementation of the embodiment of the present disclosure, the user input unit 121 is further configured to, after connecting the first port and the third port and setting the port types of the first port and the second port to the second type, receive an eighth operation, where the eighth operation is used to connect the second port and the fifth port;

the processing unit 124 is further configured to, in response to the eighth operation, connect the second port and the fifth port, and keep the port types of the first port and the second port as the second type.

As an implementation of the embodiment of the present disclosure, the user input unit 121 is further configured to, after connecting the second port and the fifth port, receive a ninth operation, where the ninth operation is used to disconnect the first port from the third port;

the processing unit 124 is further configured to, in response to the ninth operation, disconnect the first port from the third port, and set the port types of the first port and the second port to the first type.

As an implementation of the embodiment of the present disclosure,

The user input unit 121 is further configured to, after connecting the second port and the fifth port, receive a tenth operation, where the tenth operation is used to disconnect the second port from the fifth port;

the processing unit 124 is further configured to, in response to the tenth operation, disconnect the second port from the fifth port, and keep the port types of the first port and the second port as the second type.

The group node editing apparatus provided in the embodiment can execute the group node editing method provided by above method embodiments, and implementation principles and technical effects thereof are similar, and will not be repeated here.

Figure 13:
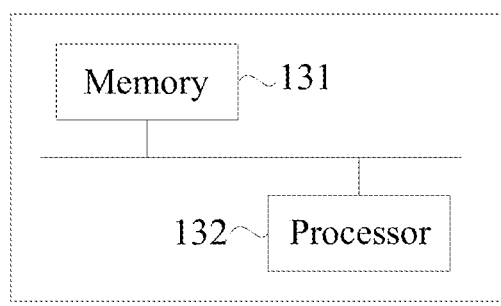
FIG. 13 is a schematic diagram of a hardware structure of an electronic device provided by an embodiment of the present disclosure.

Based on the same inventive concept, an embodiment of the present disclosure further provides an electronic device. FIG. 13 is a schematic structural diagram of an electronic device provided by an embodiment of the present disclosure. As shown in FIG. 13, the electronic device provided by the embodiment comprises: a memory 131 and a processor 132, where the memory 131 is configured to store a computer program; the processor 132 is configured to, when the computer program is invoked, execute the group node editing method provided by above embodiments.

Based on the same inventive concept, an embodiment of the present disclosure further provides a computer-readable storage medium having a computer program stored thereon, which, when executed by a processor, causes the computing device to implement the group node editing method provided by above embodiments.

Based on the same inventive concept, an embodiment of the present disclosure further provides a computer program product, which, when runs on a computer, causes the computing device to implement the group node editing method provided by above embodiments.

As will be appreciated by those skilled in the art, embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage media having computer-usable program code contained therein.

The processor may be a Central Processing Unit (CPU), other general-purpose processor, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. A general purpose processor may be a microprocessor or the processor may be any conventional processor or the like.

The memory may include the form of a non-persistent memory in a computer readable medium, a random access memory (RAM) and/or non-volatile memory, for example, a read only memory (ROM) or a flash RAM. The memory is an example of a computer-readable medium.

The computer readable media includes persistent and non-persistent, removable and non-removable storage media. A storage medium can be implemented by any method or technology for storage of information, and the information can be computer readable instructions, data structures, units of programs, or other data. Examples of computer storage media include, but not limited to, a Phase-Change Memory (PRAM), a Static Random Access Memory (SRAM), a Dynamic Random Access Memory (DRAM), other types of Random Access Memory (RAM), a Read Only Memory (ROM), an Electrically Erasable Programmable Read Only Memory (EEPROM), a Flash Memory or other memory technology, a Compact Disc Read Only Memory (CD-ROM), Digital Versatile Disc (DVD) or other optical storage, magnetic tape cartridges, magnetic disk storage or other magnetic storage devices or any other non-transmission medium, which can be used to store information that can be accessed by a computing device. Computer-readable media, as defined herein, excludes transitory computer-readable media, such as modulated data signals and carrier waves.

Finally, it should be noted that above embodiments are only used to illustrate the technical solutions of the present disclosure, but not to limit them; although the present disclosure has been described in detail with reference to the foregoing embodiments, those of ordinary skilled in the art should understand that: the technical solutions recited in the foregoing embodiments can still be modified, or some or all of the technical features thereof can be equivalently substitute; and these modifications or substitutions do not make the essence of the corresponding technical solutions deviate from the range of the technical solutions of the embodiments of the present disclosure.

What is claimed is:

1. A group node editing method, comprising:
receiving a first operation on a target group node;
in response to the first operation, displaying a node presentation interface, the node presentation interface including: nodes constituting the target group node, ports on the nodes, and connection relationships between the ports;
receiving a second operation on an output node in the nodes constituting the target group node, where the second operation is used to add a port on the output node;
in response to the second operation, adding a first port on the output node, adding a second port corresponding to the first port on the target group node, and setting port types of the first port and the second port to a first type;
receiving a third operation, where the third operation is used to connect the first port and a third port;
in response to the third operation, connecting the first port and the third port, and setting the port types of the first port and the second port to a second type, the second type being the port type of the third port.

2. The method according to claim 1, wherein after connecting the first port and the third port, and setting the port types of the first port and the second port to the second type, the method further comprises:
receiving a fourth operation, where the fourth operation is used to connect the first port and a fourth port;
determining whether the port type of the fourth port is the second type;
if so, connecting the first port and the fourth port, and keeping the port types of the first port and the second port as the second type;
if not, outputting prompt information, where the prompt information is used to prompt that the first port and the fourth port are not allowed to be connected.

3. The method according to claim 2, wherein after connecting the first port and the fourth port, the method further comprises:
receiving a fifth operation, where the fifth operation is used to disconnect the first port from the third port or the fourth port;
in response to the fifth operation, disconnecting the first port from the third port or the fourth port, and keeping the port types of the first port and the second port as the second type.

4. The method according to claim 2, wherein after connecting the first port and the fourth port, the method further comprises:
receiving a sixth operation, where the sixth operation is used to disconnect the first port from the third port and the fourth port;
in response to the sixth operation, disconnecting the first port from the third port and the fourth port, and setting the port types of the first port and the second port to the first type.

5. The method according to claim 1, wherein after connecting the first port and the third port, and setting the port types of the first port and the second port to the second type, the method further comprises:
receiving a seventh operation, where the seventh operation is used to disconnect the first port from the third port;
in response to the seventh operation, disconnecting the first port from the third port, and setting the port types of the first port and the second port to the first type.

6. The method according to claim 1, wherein after connecting the first port and the third port, and setting the port types of the first port and the second port to the second type, the method further comprises:
receiving an eighth operation, where the eighth operation is used to connect the second port and the fifth port;
in response to the eighth operation, connecting the second port and the fifth port, and keeping the port types of the first port and the second port as the second type.

7. The method according to claim 6, wherein after connecting the second port and the fifth port, the method further comprises:
receiving a ninth operation, where the ninth operation is used to disconnect the first port from the third port;
in response to the ninth operation, disconnecting the first port from the third port, and setting the port types of the first port and the second port to the first type.

8. The method according to claim 6, wherein after connecting the second port and the fifth port, the method further comprises:
receiving a tenth operation, where the tenth operation is used to disconnect the second port from the fifth port;
in response to the tenth operation, disconnecting the second port from the fifth port, and keeping the port types of the first port and the second port as the second type.

9. A group node editing apparatus, comprises:
a user input unit configured to receive a first operation on a target group node;
a display unit configured to, in response to the first operation, display a node presentation interface, the node presentation interface including: nodes constituting the target group node, ports on the nodes, and connection relationships between the ports;
the user input unit is further configured to receive a second operation on an output node in the nodes constituting the target group node, where the second operation is used to add a port on the output node;
a port adding unit configured to, in response to the second operation, add a first port on the output node, add a second port corresponding to the first port on the target group node, and set port types of the first port and the second port to a first type;
the user input unit is further configured to receive a third operation, where the third operation is used to connect the first port and a third port;
a processing unit configured to, in response to the third operation, connect the first port and the third port, and set the port types of the first port and the second port to a second type, the second type being the port type of the third port.

10. The apparatus according to claim 9, wherein the user input unit is further configured to, after connecting the first port and the third port and setting the port types of the first port and the second port to the second type, receive a fourth operation, where the fourth operation is used to connect the first port and a fourth port;
the processing unit is further configured to determine whether the port type of the fourth port is the second type; if so, connect the first port and the fourth port, and keep the port types of the first port and the second port as the second type; if not, output prompt information, where the prompt information is used to prompt that the first port and the fourth port are not allowed to be connected.

11. The apparatus according to claim 10, wherein the user input unit is further configured to, after connecting the first port and the fourth port, receive a fifth operation, where the fifth operation is used to disconnect the first port from the third port or the fourth port;

the processing unit is further configured to, in response to the fifth operation, disconnect the first port from the third port or the fourth port, and keep the port types of the first port and the second port as the second type.

12. The apparatus according to claim 10, wherein the user input unit is further configured to, after connecting the first port and the fourth port, receive a sixth operation, where the sixth operation is used to disconnect the first port from the third port and the fourth port;

the processing unit is further configured to, in response to the sixth operation, disconnect the first port from the third port and the fourth port, and set the port types of the first port and the second port as the first type.

13. The apparatus according to claim 9, wherein the user input unit is further configured to, after connecting the first port and the third port and setting the port types of the first port and the second port to the second type, receive a seventh operation, where the seventh operation is used to disconnect the first port from the third port;

the processing unit is further configured to, in response to the seventh operation, disconnect the first port from the third port, and set the port types of the first port and the second port to the first type.

14. The apparatus according to claim 9, wherein the user input unit is further configured to, after connecting the first port and the third port and setting the port types of the first port and the second port to the second type, receive an eighth operation, where the eighth operation is used to connect the second port and the fifth port;

the processing unit is further configured to, in response to the eighth operation, connect the second port and the fifth port, and keep the port types of the first port and the second port as the second type.

15. The apparatus according to claim 14, wherein the user input unit is further configured to, after connecting the second port and the fifth port, receive a ninth operation, where the ninth operation is used to disconnect the first port from the third port;

the processing unit is further configured to, in response to the ninth operation, disconnect the first port from the third port, and set the port types of the first port and the second port to the first type.

16. The apparatus according to claim 14, wherein the user input unit is further configured to, after connecting the second port and the fifth port, receive a tenth operation, where the tenth operation is used to disconnect the second port from the fifth port;

the processing unit is further configured to, in response to the tenth operation, disconnect the second port from the fifth port, and keep the port types of the first port and the second port as the second type.

17. An electronic device, comprises: a memory and a processor, wherein the memory is configured to store a computer program; the processor is configured to, when executing the computer program, cause the electronic device to implement the group node editing method according to claim 1.

18. A non-transitory computer-readable storage medium, wherein the non-transitory computer-readable storage medium having a computer program stored thereon, which, when executed by a computing device, causes the computing device to implement the group node editing method according to claim 1.

* * * * *